(12) United States Patent
Okawa et al.

(10) Patent No.: US 11,015,992 B2
(45) Date of Patent: May 25, 2021

(54) LOAD SENSOR UNIT AND INPUT DEVICE

(71) Applicant: Alps Alpine Co., Ltd., Tokyo (JP)

(72) Inventors: Hisanobu Okawa, Miyagi-ken (JP);
Eiji Umetsu, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/748,593

(22) Filed: Jan. 21, 2020

(65) Prior Publication Data

US 2020/0158583 A1 May 21, 2020

Related U.S. Application Data

(63) Continuation of application No. PCT/JP2018/029315, filed on Aug. 3, 2018.

(30) Foreign Application Priority Data

Aug. 7, 2017 (JP) .............................. JP2017-152408

(51) Int. Cl.
*G06F 3/0354* (2013.01)
*G01L 1/26* (2006.01)
*G01L 5/22* (2006.01)

(52) U.S. Cl.
CPC ............ *G01L 1/26* (2013.01); *G06F 3/03545* (2013.01); *G01L 5/22* (2013.01)

(58) Field of Classification Search
CPC .. G06F 3/03545; G01L 1/26; G01L 5/22–228
See application file for complete search history.

(56) References Cited

U.S. PATENT DOCUMENTS 5,581,052 A 12/1996 Padula et al.
5,981,883 A 11/1999 Shriver
(Continued)

FOREIGN PATENT DOCUMENTS

JP H09-503879 4/1997
JP 3050535 4/1998
(Continued)

OTHER PUBLICATIONS

International Search Report from corresponding application No. PCT/JP2018/029315, 2pgs, dated Oct. 23, 2018.
(Continued)

*Primary Examiner* — Gene W Lee
(74) *Attorney, Agent, or Firm* — Brinks Gilson & Lione

(57) ABSTRACT

A load sensor unit according to an aspect of the present invention includes an operating part movable forward and backward in a first direction; a load sensor that has a pressure receiving part and outputs a signal according to a load received in the first direction by the pressure receiving part; a linking part that has one end part linked to the operating part and an other end part that causes the pressure receiving part to operate and is movable forward and backward in the first direction in synchronization with the operating part; and an elastic member that gives biasing force to the other end part of the linking part and gives an initial load to the pressure receiving part through the other end part. This can prevent a load sensor from being broken by an overload with a simple configuration and fully demonstrate detection accuracy of the load sensor.

11 Claims, 12 Drawing Sheets

(56) References Cited

U.S. PATENT DOCUMENTS

| | | | |
|---|---|---|---|
| 7,657,128 B2* | 2/2010 | Silverbrook | B41J 2/17553 382/313 |
| 7,974,500 B2* | 7/2011 | Silverbrook | B41J 2/17513 382/313 |
| 8,833,179 B2 | 9/2014 | Ohara | |
| 9,239,639 B1 | 1/2016 | Vanderet et al. | |
| 2007/0040817 A1* | 2/2007 | Underwood | B43K 29/004 345/179 |
| 2010/0021022 A1* | 1/2010 | Pittel | G06F 3/03545 382/123 |
| 2018/0238749 A1 | 8/2018 | Doko et al. | |
| 2019/0369758 A1* | 12/2019 | Yamashita | G06F 3/046 |
| 2020/0033986 A1* | 1/2020 | Kampf | G06F 3/016 |

FOREIGN PATENT DOCUMENTS

| | | |
|---|---|---|
| JP | 2014-44180 | 3/2014 |
| TW | 201544998 | 12/2015 |
| TW | 201601010 | 1/2016 |
| TW | 201701710 | 1/2017 |
| WO | WO 2012 096213 A1 | 7/2012 |
| WO | WO 2016/114248 A1 | 7/2016 |

OTHER PUBLICATIONS

Notification of Reason of Refusal from corresponding Taiwanese Application No. 107124457, 5pgs., dated Apr. 12, 2019.

\* cited by examiner

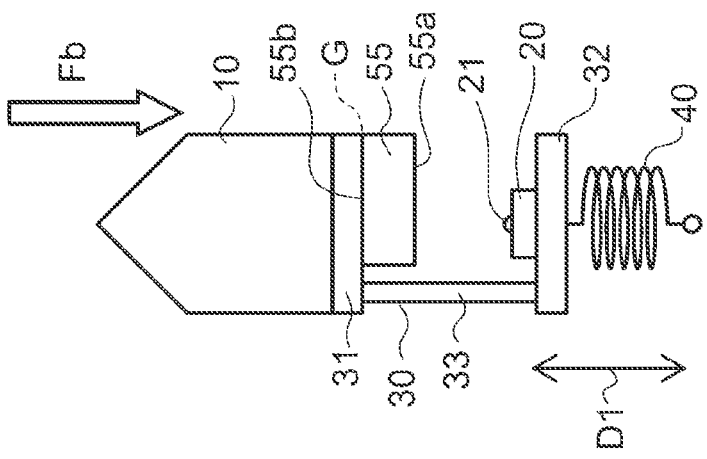
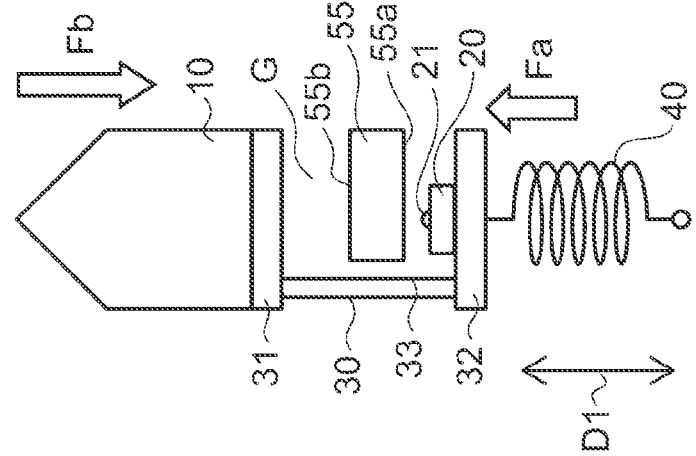
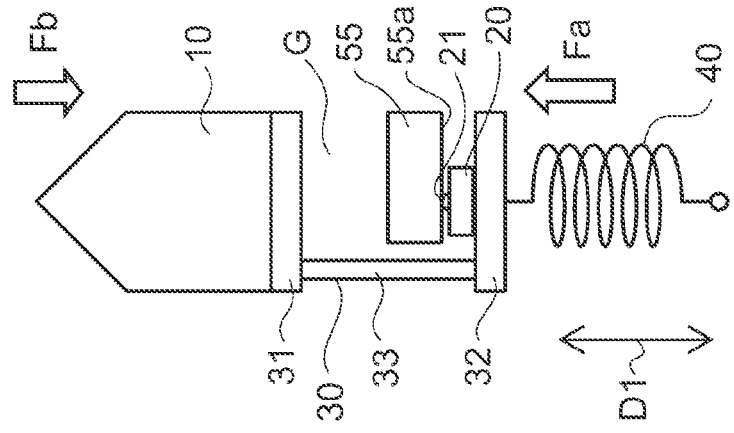

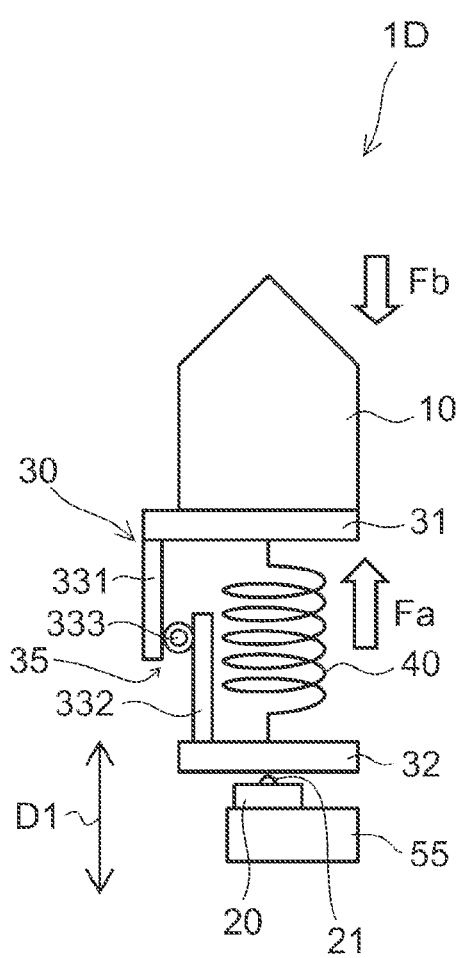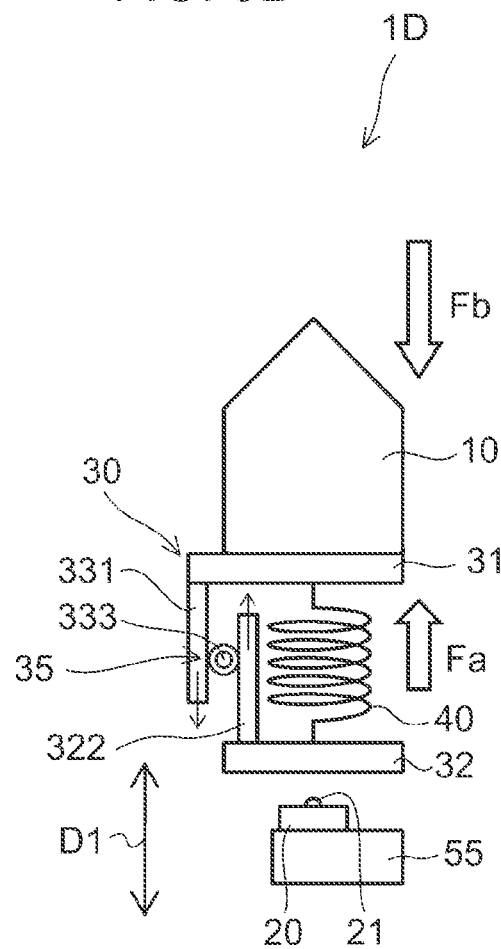

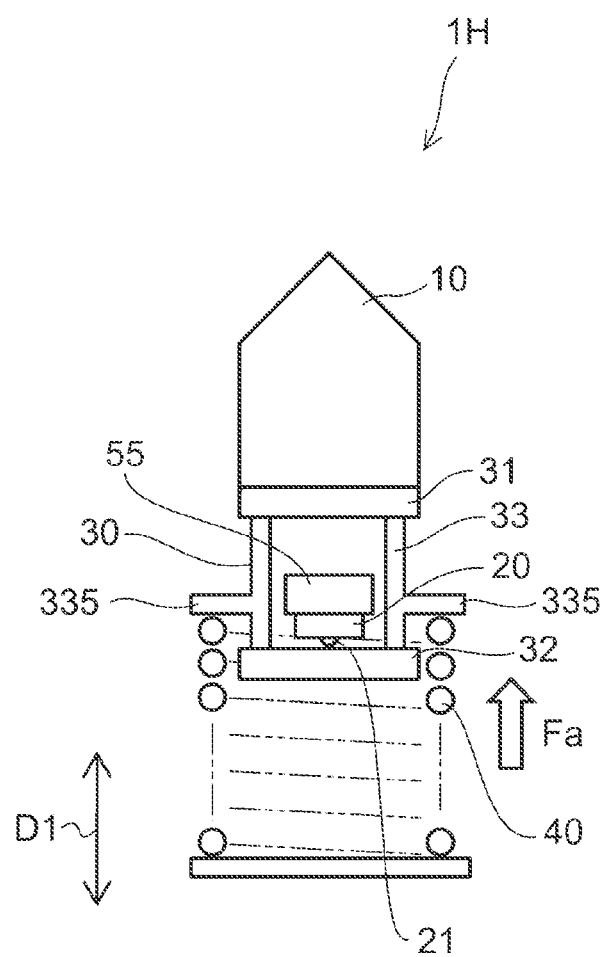

LOAD SENSOR UNIT AND INPUT DEVICE

CLAIM OF PRIORITY

This application is a Continuation of International Application No. PCT/JP2018/029315 filed on Aug. 3, 2018, which claims benefit of priority to Japanese Patent Application No. 2017-152408 filed on Aug. 7, 2017. The entire contents of each application noted above are hereby incorporated by reference.

BACKGROUND

1. Field of the Disclosure

The present disclosure relates to a load sensor unit and an input device. More specifically, the present disclosure relates to a load sensor unit and an input device that can protect a load sensor when excessive force is applied to an operating unit.

2. Description of the Related Art

A load sensor unit is a device that detects a load applied to an operating unit and outputs a signal according to the load. The load sensor unit is applied, for example, to a pen-type input device (a stylus pen) or a touch panel. The pen-type input device detects a pen pressure applied to an operating unit that is a pen tip and outputs a signal according to the pen pressure. The touch panel has load sensor units disposed, for example, at four corners of the panel, detects loads applied to the load sensor units when the touch panel is pressed by a finger or a pen, and finds a pressed position on the touch panel based on balance of the loads detected by the load sensor units.

International Publication No. 2012/096213 discloses a pressing-type input device that can prevent a load sensor from being broken even in a case where an overload is applied. This pressing-type input device is configured such that an operating load applied to a pressed part causes force to act on a pressing part in a direction to reduce an initial load on the load sensor in a position serving as a fulcrum supported by a support member in order to prevent breakage of the load sensor.

International Publication No. 2016/114248 discloses a force sensor unit that has a simple structure, can be easily assembled, and can be easily reduced in size. The force sensor unit is configured such that a load from an operating member is not directly applied to a force sensor by disposing a coil spring between an operated member and a contact member.

Japanese Unexamined Patent Application Publication No. 2014-044180 discloses a strain sensor module that detects deformation of a target object caused by external force and can avoid damage of a strain sensor caused by excessive deformation. This strain sensor module is configured such that a preload is given in advance by slightly warping a strain-inducing plate on which the strain sensor is disposed by using a protrusion member so that a load on the strain sensor is reduced when force is applied.

It is undesirable to have a complicated or large structure to prevent a load sensor from breaking by an overload in a load sensor. Even a structure that can prevent a load sensor from breaking by an overload is hard to apply to a product if originally-intended the detection accuracy of the load sensor cannot be demonstrated.

SUMMARY

A load sensor unit according to one aspect, includes an operating part that is movable forward and backward in a first direction. The load sensor unit has a load sensor that has a pressure receiving part and outputs a signal according to a load received in the first direction by the pressure receiving part. a linking part has one end part linked to the operating part and an other end part that causes the pressure receiving part to operate and is movable forward and backward in the first direction in synchronization with the operating part; and an elastic member that gives biasing force to the other end part of the linking part and gives an initial load to the pressure receiving part through the other end part.

According to this configuration, an initial load is given to the pressure receiving part by the elastic member even in a state where no load is applied to the operating part, and a load applied to the operating part acts to decrease a load given to the pressure receiving part from the initial load. In a case where a load exceeding the initial load is applied to the operating part, the linking part and the pressure receiving part move away from each other. Accordingly, an overload exceeding the initial load is not applied to the load sensor. Furthermore, since a direction of forward and backward movement of the operating part, a direction of a load received by the pressure receiving part, and a direction of forward and backward movement of the linking part are the same direction, that is, the first direction, a load linearly acts on the load sensor. This allows stable detection of the load sensor.

An input device according to another aspect includes the load sensor unit. This makes it possible to provide an input device that can prevent a load sensor from being broken by an overload.

BRIEF DESCRIPTION OF THE DRAWINGS

FIGS. 7A through 7C are schematic views illustrating another (first) example of the configuration;

FIGS. 9A and 9B are schematic views illustrating another (third) example of the configuration;

FIG. 13 is a schematic view illustrating another (seventh) example of the configuration.

DESCRIPTION OF THE EXEMPLARY EMBODIMENTS

An embodiment of the present invention is described below with reference to the drawings. In the following description, identical members are given identical reference signs, and repeated description of the members are omitted as appropriate.

Configuration of Load Sensor Unit

Figure 1:
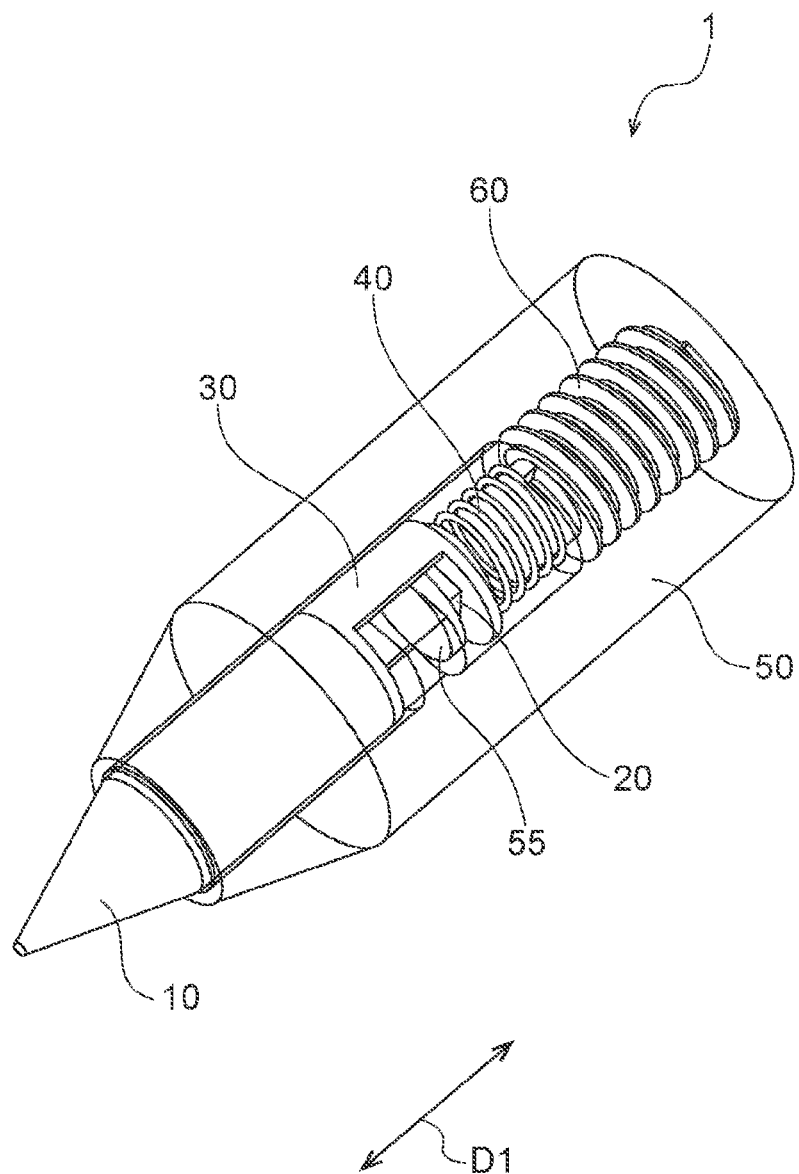
FIG. 1 is a perspective view illustrating a load sensor unit according to the present embodiment.

FIG. 1 is a perspective view illustrating a load sensor unit according to the present embodiment.

Figure 2:
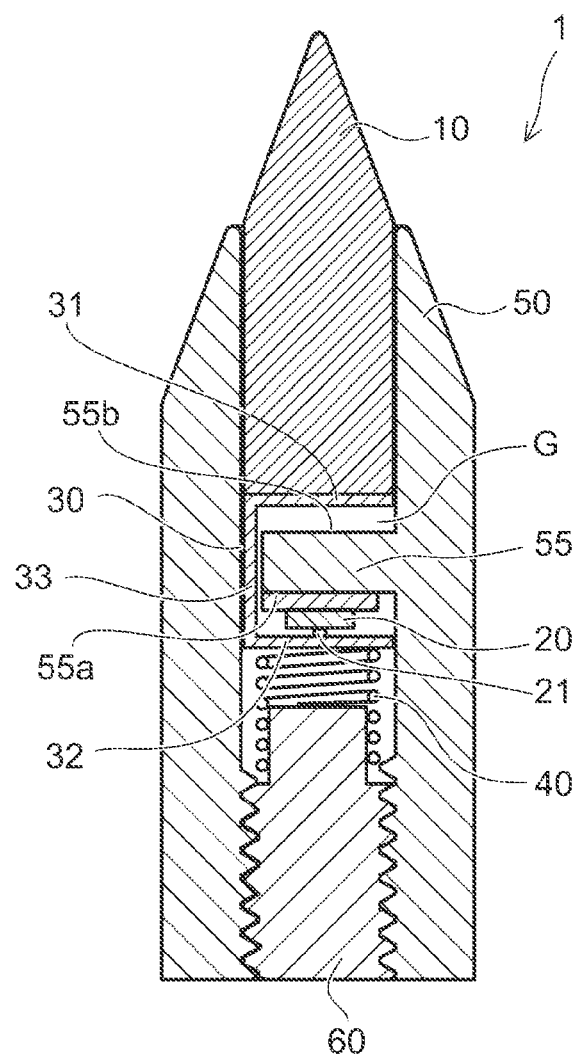
FIG. 2 is a cross-sectional view illustrating the load sensor unit according to the present embodiment.

FIG. 2 is a cross-sectional view illustrating the load sensor unit according to the present embodiment.

Figure 3:
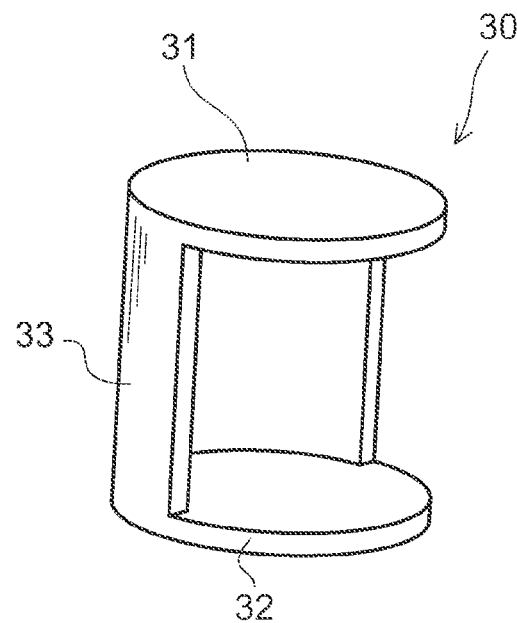
FIG. 3 is a perspective view illustrating a linking part applied in the load sensor unit.

FIG. 3 is a perspective view illustrating a linking part applied in the load sensor unit.

A load sensor unit 1 according to the present embodiment is a device that detects a load applied to an operating part 10 by using a load sensor 20 and outputs an electric signal according to the load. The present embodiment discusses an example of application to a pen-type input device (a stylus pen).

As illustrated in FIGS. 1 and 2, the load sensor unit 1 includes the operating part 10 that is movable forward and backward in a first direction D1, the load sensor 20 that outputs a signal according to a load received by a pressure receiving part 21, a linking part 30 that is movable forward and backward in the first direction D1, and an elastic member 40 that gives an initial load to the pressure receiving part 21.

The load sensor unit 1 further includes a case 50 that is a housing, and the operating part 10, the load sensor 20, the linking part 30, and the elastic member 40 are contained in the case 50. In the pen-type input device, the case 50 has a cylindrical shape, and a longitudinal direction (an axial direction) of the cylinder is the first direction D1.

The operating part 10 that corresponds to a pen tip of the pen-type input device is disposed at one end of the case 50. A pointed front end part of the operating part 10 is exposed from the one end of the case 50, and a rear end of the operating part 10 is disposed in the case 50. When the front end part of the operating part 10 that serves as a pen tip makes contact with a touch panel or the like, reactive force caused by the contact is received as pressing force by the operating part 10. Since the operating part 10 is provided so as to be movable in the first direction D1, which is the axial direction, in the cylinder of the case 50, the front end part (pen tip) of the operating part 10 is pushed into the case 50 in a case where pressing force larger than predetermined force is received. Hereinafter, a front end part side of the operating part 10 in the first direction D1 is also referred to as a front end side, and a side opposite to the front end part side in the first direction D1 is also referred to as a rear end side.

The load sensor 20 is, for example, a semiconductor strain resistance element and outputs a signal according to a load based on a change in electric resistance caused by the load received by the pressure receiving part 21. The pressure receiving part 21 has, for example, a substantially spherical shape or a substantially hemispherical shape so that a load received by the pressure receiving part 21 easily transmits to a sensor body.

The load sensor 20 is mounted on a reference member 55. The reference member 55 has one surface 55a on the rear end side and an other surface 55b on the front end side. Plane directions of the one surface 55a and the other surface 55b are orthogonal to the first direction D1 in the case 50. In the present embodiment, the load sensor 20 is mounted on the one surface 55a of the reference member 55.

The linking part 30 is disposed on the rear end side of the operating part 10 in the case 50. The linking part 30 has one end part 31, an other end part 32, and a connecting part 33 that connects the one end part 31 and the other end part 32. The one end part 31 and the other end part 32 are disposed so as to face each other. The connecting part 33 is a member that links the one end part 31 and the other end part 32.

As illustrated in FIG. 3, the one end part 31, the other end part 32, and the connecting part 33 may be provided so as to be integral with one another. The one end part 31 and the other end part 32 have, for example, a disk shape and are disposed so as to be orthogonal to the axis of the case 50. The one end part 31 and the other end part 32 are spaced away from each other by a predetermined interval in the axial direction (the first direction D1), and the connecting part 33 is provided so that a space between the one end part 31 and the other end part 32 is partially opened. An external diameter of the linking part 30 is slightly smaller than an inner diameter of the cylinder of the case 50 so that the linking part 30 is slidable in the first direction D1 in the cylinder.

The one end part 31 of the linking part 30 is linked to the operating part 10. The other end part 32 of the linking part 30 causes the pressure receiving part 21 of the load sensor 20 to operate. In the example illustrated in FIGS. 1 and 2, the load sensor 20 is disposed between the one end part 31 and the other end part 32. Specifically, the reference member 55 is disposed between the one end part 31 and the other end part 32, and the load sensor 20 is mounted on the one surface 55a of the reference member 55. Accordingly, the pressure receiving part 21 of the load sensor 20 faces the rear end side so that the pressure receiving part 21 can make contact with the other end part 32.

Since the linking part 30 and the operating part 10 are linked, forward and backward movement of the operating part 10 in the first direction D1 causes the linking part 30 to move forward and backward in the first direction D1 in the case 50 in synchronization with the operating part 10. As a result of the movement of the operating part 10 and the linking part 30, the other end part 32 of the linking part 30 causes the pressure receiving part 21 to operate. Specifically, in a case where the operating part 10 and the linking part 30 move toward the front end side, the pressure receiving part 21 is pressed by the other end part 32 of the linking part 30. Meanwhile, in a case where the operating part 10 and the linking part 30 move toward the rear end side, pressing force applied from the other end part 32 of the linking part 30 to the pressure receiving part 21 is weakened.

The elastic member 40 is, for example, a coil spring. The elastic member 40 is disposed on the rear end side of the linking part 30 in the case 50. The elastic member 40 gives biasing force to the other end part 32 of the linking part 30. This gives an initial load to the pressure receiving part 21 through the other end part 32.

The initial load given by the elastic member 40 is adjustable by an adjustment mechanism 60. The adjustment mechanism 60 is, for example, a screw mechanism provided on the rear end side of the elastic member 40 in the case 50. The coil spring that is the elastic member 40 is disposed between the other end part 32 and the screw mechanism that is the adjustment mechanism 60 in the case 50. Accordingly, when a screw of the screw mechanism is rotated (e.g., fastened) toward one side, the coil spring contracts and the initial load increases accordingly. Meanwhile, when the screw is rotated (e.g., loosened) toward the other side), the coil spring stretches and the initial load weakens accordingly.

When the biasing force is given to the other end part 32 by the elastic member 40, the linking part 30 is pressed toward the front end side in the case 50. As a result, the load sensor 20 is sandwiched between the other end part 32 and the reference member 55, and the biasing force of the elastic member 40 is received by the pressure receiving part 21 through the other end part 32. In a state where no load is given to the operating part 10 (hereinafter also referred to as an "initial state"), the biasing force of the elastic member 40 is given to the load sensor 20 as an initial load.

Since the linking part 30 is pressed toward the front end side by the elastic member 40, a gap G is created between the one end part 31 of the linking part 30 and the other surface 55b of the reference member 55.

In the load sensor unit 1 described above, the initial load is given to the pressure receiving part 21 in the initial state, and therefore a signal according to the initial load is output from the load sensor 20 even in a case where no load is applied to the operating part 10. When a load is applied to the operating part 10, the load is given to the pressure receiving part 21 through the linking part 30. This acts so that the load applied to the pressure receiving part 21 decreases from the initial load. Therefore, even in a case where a load is applied to the operating part 10, only a load equal to or smaller than the initial load is applied to the pressure receiving part 21. That is, it is possible to avoid application of an overload exceeding the initial load.

In the present embodiment, the operating part 10, the load sensor 20, the linking part 30, and the elastic member 40 are arranged in the first direction D1 in the case 50, and therefore a direction of forward and backward movement of the operating part 10, a direction of a load received by the pressure receiving part 21, and a direction of forward and backward movement of the linking part 30 are the same, that is, the first direction D1. Accordingly, the load applied to the operating part 10 linearly transmits to the load sensor 20 without escaping. This allows stable detection.

Operation of Load Sensor Unit

Figure 4A:
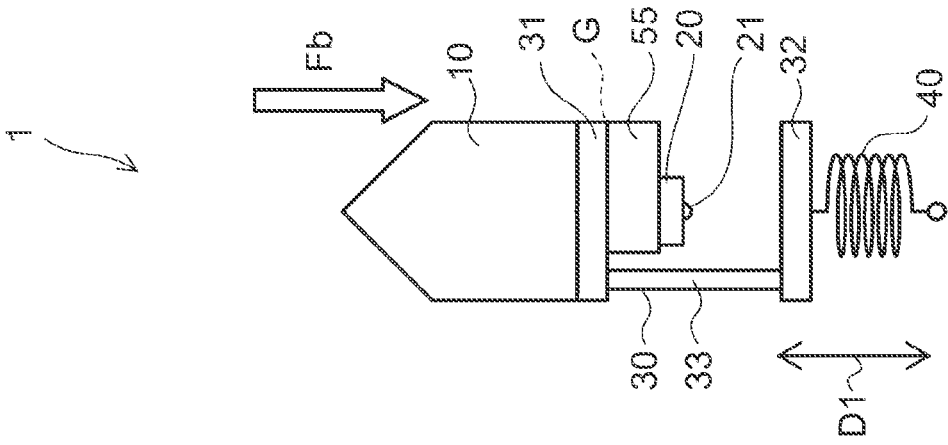
FIGS. 4A through 4C are schematic views for explaining operation of a load sensor unit according to the present embodiment.
Figure 4B:
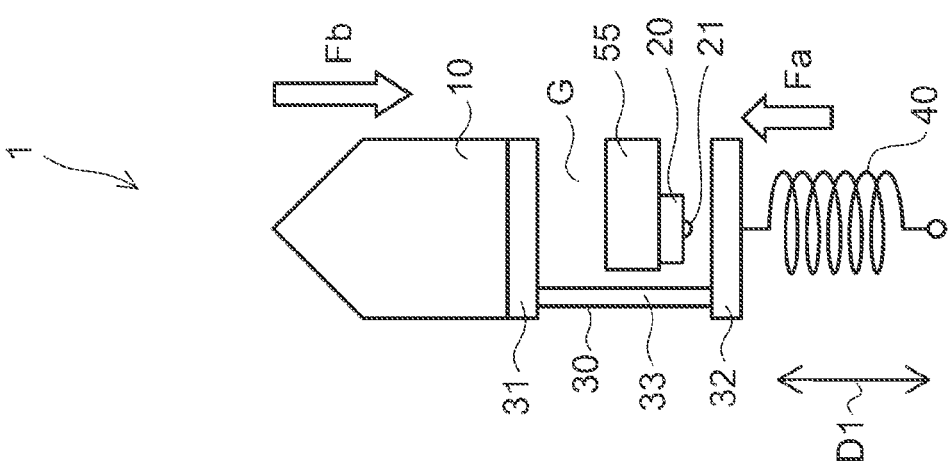
Figure 4C:
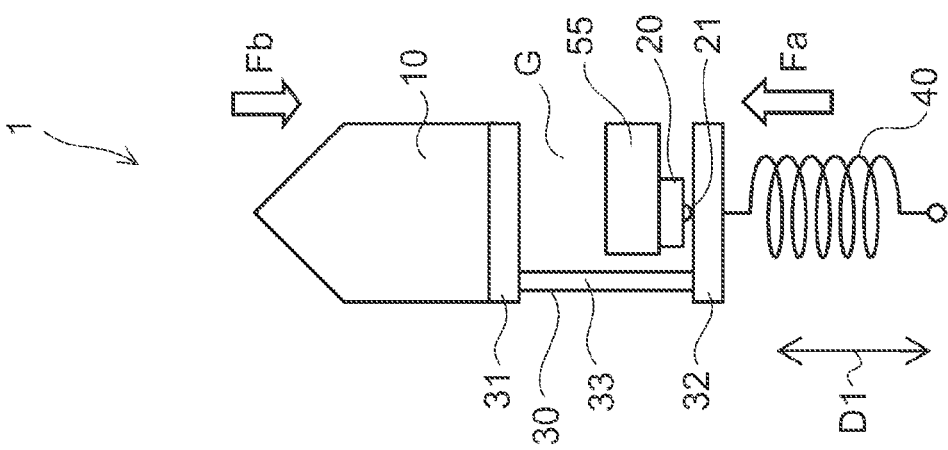

FIGS. 4A through 4C are schematic view for explaining operation of the load sensor unit according to the present embodiment. For convenience of description, FIGS. 4A through 4C are model diagrams.

FIG. 4A illustrates an initial state. In the initial state, biasing force of the elastic member 40 is given to the pressure receiving part 21 through the other end part 32 of the linking part 30. As a result, an initial load Fa is given to the load sensor 20. In this state, in a case where the operating part 10 receives an operating load Fb, a load (Fa−Fb) obtained by subtracting the operating load Fb from the initial load Fa is given to the pressure receiving part 21 by the operating load Fb opposite to the initial load Fa.

In a case where the operating load Fb is smaller than the initial load Fa, a position of the operating part 10 in the first direction D1 does not change. Accordingly, a signal according to the load (Fa−Fb) obtained by subtracting the operating load Fb received by the operating part 10 from the initial load Fa is output from the load sensor 20. That is, an output signal that has decreased in accordance with the operation load Fb from an output signal corresponding to the initial load Fa is obtained.

Next, as illustrated in FIG. 4B, in a case where the operating load Fb received by the operating part 10 exceeds the initial load Fa, the operating load Fb surpasses the biasing force of the elastic member 40 and pushes the operating part 10 and the linking part 30 toward the rear end side. This causes the other end part 32 of the linking part 30 to move away from the pressure receiving part 21 of the load sensor 20. As a result, no load is applied to the pressure receiving part 21.

Next, as illustrated in FIG. 4C, when the operating load Fb received by the operating part 10 further increases and the linking part 30 is pushed until no gap G is present, the one end part 31 of the linking part 30 makes contact with the other surface 55b of the reference member 55. Accordingly, the operating part 10 and the linking part 30 are not pushed further. That is, the reference member 55 plays a role as a stopper in movement of the operating part 10.

Figure 5:
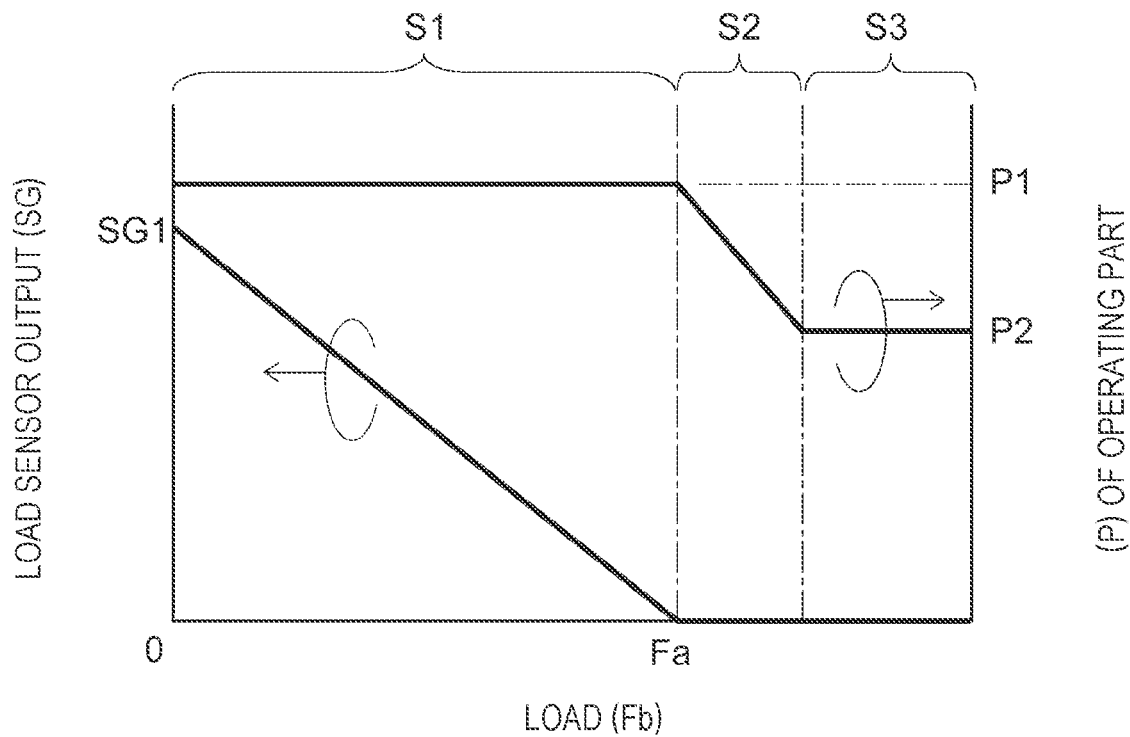
FIG. 5 illustrates a relationship between (i) pressing force and (ii) load sensor output and a position of an operating part.

FIG. 5 illustrates a relationship between (i) pressing force and (ii) load sensor output and a position of an operating part.

In FIG. 5, the horizontal axis represents a load (operating load Fb) received by the operating part 10, the left vertical axis represents an output value (SG) of the load sensor 20, and the right vertical axis represents a position (P) of the operating part 10. The operating part 10 is located at a highest position (P1) in the initial state, and the position of the operating part 10 becomes lower as the operating part 10 is pushed.

In the initial state, that is, in a case where the operating load Fb is zero, the initial load Fa is given to the pressure receiving part 21, and a signal (SG1) according to the initial load Fa is output from the load sensor 20 (see FIG. 4A). When the operating load Fb is given to the operating part 10, a load obtained by subtracting the operating load Fb from the initial load Fa is given to the pressure receiving part 21. Accordingly, a signal according to (the initial load Fa−the operating load Fb) is output from the load sensor 20. A region where a signal output from the load sensor 20 decreases as the operating load Fb increases is a detection region S1 (see FIG. 4A). In this detection region S1, sensor output according to the load received by the operating part 10 can be obtained.

The detection region S1 is a region from the initial state to a state where the operating load Fb reaches the initial load Fa. In this detection region S1, the position of the operating part 10 hardly changes (the change is approximately several micrometers if any). Therefore, in the pen-type input device, signal output according to a pen pressure can be obtained while a position of the pen tip is fixed.

When the operating load Fb gradually increases and becomes equal to the initial load Fa, the load given to the pressure receiving part 21 becomes zero, and the signal SG output from the load sensor 20 becomes zero. In a case where bias is set in output of the load sensor 20, a lowest value is output. When the operating load Fb exceeds the initial load Fa, the other end part 32 of the linking part 30 moves away from the pressure receiving part 21 of the load sensor 20. In a case where the operating load Fb exceeds the initial load Fa, the signal SG output from the load sensor 20 remains zero. Since the operating load Fb exceeds the initial load Fa, the operating part 10 and the linking part 30 are pushed toward the rear end side. Accordingly, the position of the operating part 10 is gradually lowered (pushed toward the rear end side). This region is an overload region S2 (see FIG. 4B).

When the operating load Fb further increases in the overload region S2, the gap G disappears eventually, and the one end part 31 of the linking part 30 makes contact with the other surface 55b of the reference member 55. That is, the other surface 55b serves as a stopper surface in movement of the operating part 10 in the first direction D1, and the operating part 10 and the linking part 30 are not pushed any further, and therefore the position of the operating part 10 is restricted at a lowest position P2. Thereafter, the position of the operating part 10 does not change even in a case where the operating load Fb increases. This region is a restriction region S3 (see FIG. 4C).

Figure 6A:
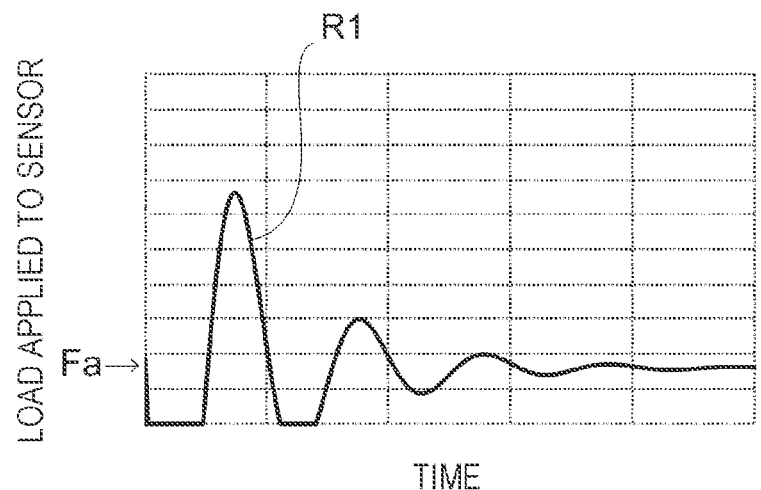
FIGS. 6A and 6B illustrate a simulation result of time response of a load applied to a load sensor.
Figure 6B:
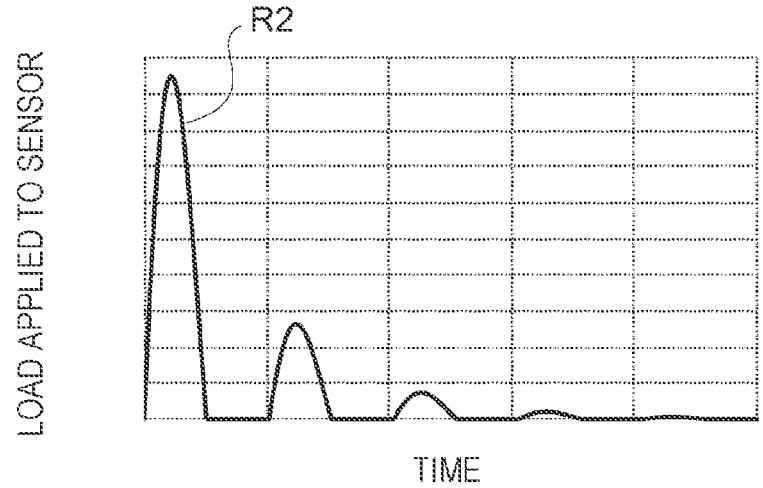

FIGS. 6A and 6B illustrate a simulation result of a time response of a load applied to a load sensor.

FIG. 6A illustrates a simulation result R1 obtained by the load sensor unit 1 according to the present embodiment, and FIG. 6B illustrates a simulation result R2 obtained by a load sensor unit according to a reference example. In the load sensor unit according to the reference example, an initial load is not given unlike the present embodiment.

A model formula of the simulation of the time response is the following Formula 1.

$$x(t) = \mathcal{L}^{-1}\left[\frac{\omega_n}{\sqrt{1-\zeta^2}} \cdot \frac{\left(\sqrt{1-\zeta^2}\,\omega_n\right)}{(s+\zeta\omega_n)^2 + \left(\sqrt{1-\zeta^2}\,\omega_n\right)^2}\right] \quad \text{[Formula 1]}$$

$$= \frac{\omega_n}{\sqrt{1-\zeta^2}} e^{-\zeta\omega_n t} \sin\left(\sqrt{1-\zeta^2}\,\omega_n t\right)$$

In Formula 1, ωn is a natural angular velocity, and is an attenuation coefficient.

As illustrated in FIGS. 6A and 6B, in both of the examples, a load is applied to the load sensor so that a load value oscillates. As is clear from the simulation result R2 illustrated in FIG. 6B, in the load sensor unit according to the reference example, a load is applied in an initial stage of the time response and increases to a maximum load. Meanwhile, as is clear from the simulation result R1 illustrated in FIG. 6A, in the load sensor unit 1 according to the present embodiment, a load is applied to decrease the applied load from the initial load Fa given in advance in an initial stage of the time response, and the load increases after reaching a minimum load.

For example, in a case where an input device to which the load sensor unit is applied falls or in a case where a rapid load is applied to an operating part, a load is rapidly applied to a load sensor, and the load sensor is broken when the applied load exceeds a withstand load of the load sensor in the load sensor unit according to the reference example. The load sensor is sensitive to shock in a case where the load sensor is a semiconductor element. In particular, the pressure receiving part 21 is a protrusion formed, for example, by etching a semiconductor material such as silicon. Therefore, a load is likely to be concentrated at the pressure receiving part 21, and the pressure receiving part 21 is easily broken.

In the load sensor unit 1 according to the present embodiment, a rapid load is not applied to the load sensor 20 in an initial stage of shock application. Therefore, according to the load sensor unit 1 according to the present embodiment, shock resistance can be increased as compared with the load sensor unit according to the reference example.

Other Examples of Configuration

Next, other examples of the configuration are described.

FIGS. 7A through 7C are schematic views illustrating another (first) example of the configuration.

In a load sensor unit 1B illustrated in FIGS. 7A through 7C, the load sensor 20 is mounted on the other end part 32 of the linking part 30. That is, the load sensor 20 in the load sensor unit 1B faces a direction opposite to a direction in which the load sensor in the load sensor unit 1 faces. Accordingly, the pressure receiving part 21 makes contact with the one surface 55a of the reference member 55.

As illustrated in FIG. 7A, in an initial state, the other end part 32 of the linking part 30 is pushed toward the front end side by biasing force of the elastic member 40. Accordingly, the pressure receiving part 21 makes contact with the one surface 55a of the reference member 55, and the initial load Fa is given to the pressure receiving part 21 upon receipt of reactive force against the biasing force of the elastic member 40. In a case where the operating load Fb is received by the operating part 10, a load (Fa−Fb) obtained by subtracting the operating load Fb from the initial load Fa is given to the pressure receiving part 21 by the operating load Fb that is opposite to the initial load Fa.

As illustrated in FIG. 7B, in a case where the operating load Fb received by the operating part 10 exceeds the initial load Fa, the operating load Fb surpasses the biasing force of the elastic member 40 and pushes the operating part 10 and the linking part 30 toward the rear end side. This causes the load sensor 20 mounted on the other end part 32 of the linking part 30 to move toward the rear end side and causes the pressure receiving part 21 to move away from the one surface 55a of the reference member 55. As a result, no load is applied to the pressure receiving part 21.

As illustrated in FIG. 7C, when the operating load Fb received by the operating part 10 further increases and the linking part 30 is pushed until the gap G disappears, the one end part 31 of the linking part 30 makes contact with the other surface 55b of the reference member 55. As a result, the operating part 10 and the linking part 30 are not pushed any further. That is, the reference member 55 plays a role as a stopper in movement of the operating part 10.

Figure 8A:
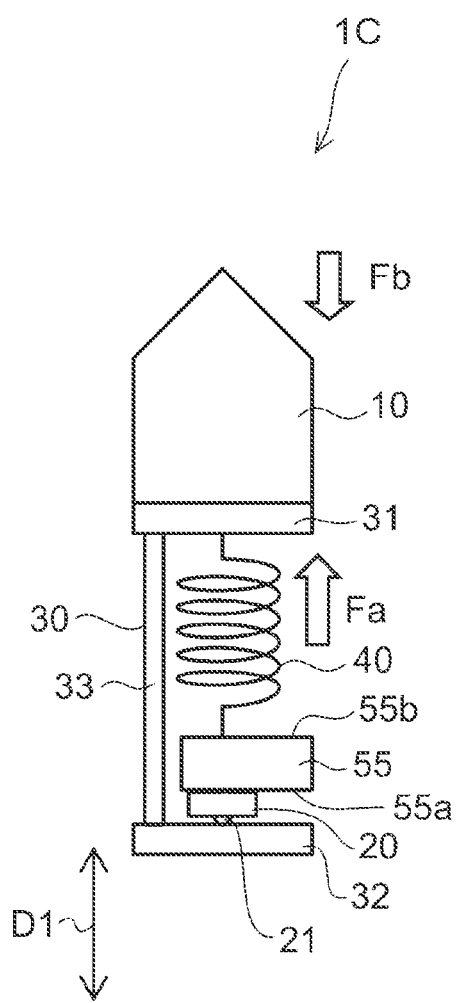
FIGS. 8A and 8B are schematic views illustrating another (second) example of the configuration.
Figure 8B:
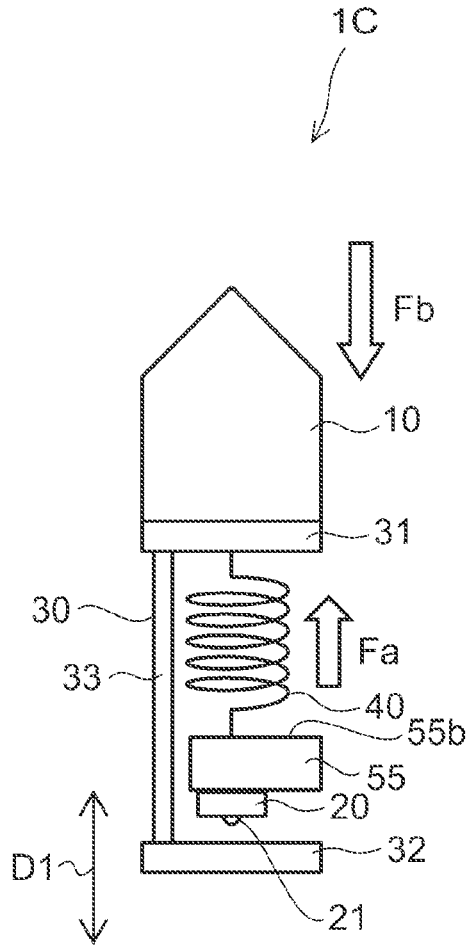

FIGS. 8A and 8B are schematic views illustrating another (second) example of the configuration.

In a load sensor unit 1C illustrated in FIGS. 8A and 8B, the elastic member 40 is disposed between the one end part 31 of the linking part 30 and the other surface 55b of the reference member 55. The load sensor 20 is mounted on the one surface 55a of the reference member 55, but the load sensor 20 may be mounted on the other end part 32 of the linking part 30 as in the load sensor unit 1B.

As illustrated in FIG. 8A, in an initial state, the other end part 32 of the linking part 30 is pressed toward the front end side by the biasing force (pull force) of the elastic member 40. As a result, the pressure receiving part 21 makes contact with the other end part 32, and the initial load Fa is given to the pressure receiving part 21 upon receipt of the biasing force of the elastic member 40. In a case where the operating load Fb is received by the operating part 10, a load (Fa−Fb) obtained by subtracting the operating load Fb from the initial load Fa is given to the pressure receiving part 21 by the operating load Fb opposite to the initial load Fa.

As illustrated in FIG. 8B, in a case where the operating load Fb received by the operating part 10 exceeds the initial load Fa, the operating load Fb surpasses the biasing force of the elastic member 40 and pushes the operating part 10 and the linking part 30 toward the rear end side. This causes the pressure receiving part 21 to move away from the other end part 32 of the linking part 30. As a result, no load is applied to the pressure receiving part 21.

In the load sensor unit 1C illustrated in FIGS. 8A and 8B, the elastic member 40 is provided between the one end part 31 and the other end part 32 of the linking part 30. This can make constituent elements compact.

FIGS. 9A and 9B are schematic views illustrating another (third) example of the configuration.

In a load sensor unit 1D illustrated in FIGS. 9A and 9B, the linking part 30 is provided with an inversion mechanism 35. The inversion mechanism 35 is configured such that the connecting part 33 of the linking part 30 is divided into a first connecting part 331 and a second connecting part 332 and a rotary member 333 such as a gear is provided between the first connecting part 331 and the second connecting part 332. Due to the inversion mechanism 35, the first connecting part 331 and the second connecting part 332 move in opposite directions in the first direction D1.

As illustrated in FIG. 9A, in an initial state, the one end part 31 and the other end part 32 of the linking part 30 move away from each other by biasing force (stretching force) of the elastic member 40, and the other end part 32 is pressed toward the rear end side. As a result, the pressure receiving part 21 makes contact with the other end part 32, and the initial load Fa is given to the pressure receiving part 21 upon receipt of the biasing force of the elastic member 40. In a case where the operating part 10 receives the operating load Fb, a load (Fa−Fb) obtained by subtracting the operating load Fb from the initial load Fa is given to the pressure receiving part 21 by the operating load Fb opposite to the initial load Fa.

As illustrated in FIG. 9B, in a case where the operating load Fb received by the operating part 10 exceeds the initial load Fa, the operating load Fb surpasses the biasing force of the elastic member 40. This narrows an interval between the one end part 31 and the other end part 32 of the linking part 30. As a result, the pressure receiving part 21 moves away from the other end part 32 of the linking part 30, and no load is applied to the pressure receiving part 21.

Figure 10A:
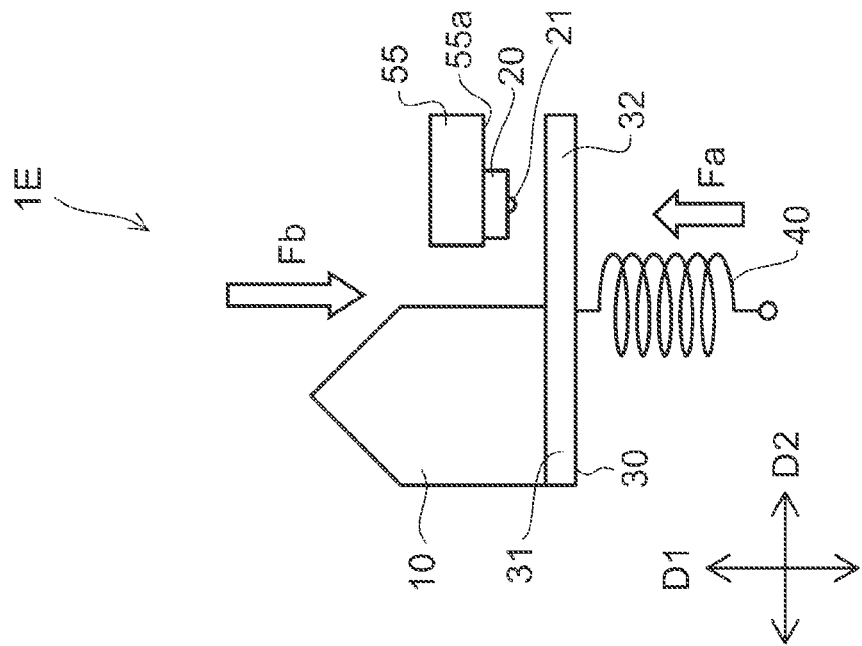
FIGS. 10A and 10B are schematic views illustrating another (fourth) example of the configuration.
Figure 10B:
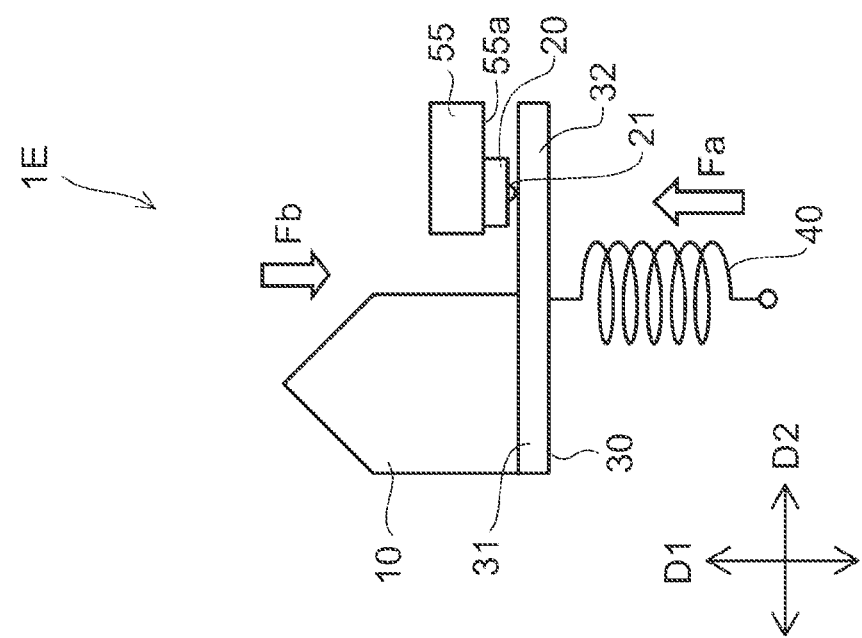

FIGS. 10A and 10B are schematic views illustrating another (fourth) example of the configuration.

In a load sensor unit 1E illustrated in FIGS. 10A and 10B, the operating part 10 and the load sensor 20 are arranged in a second direction D2 orthogonal to the first direction D1. The linking part 30 extends in the second direction D2, and the one end part 31 and the other end part 32 are arranged in the second direction D2. The operating part 10 is connected to the one end part 31 of the linking part 30. The reference member 55 faces the other end part 32 of the linking part 30, and the load sensor 20 is mounted on the one surface 55a of the reference member 55.

As illustrated in FIG. 10A, in an initial state, the linking part 30 is pushed toward the front end side by the biasing force of the elastic member 40. As a result, the pressure receiving part 21 makes contact with the other end part 32 of the linking part 30, and the initial load Fa is given to the pressure receiving part 21 upon receipt of reactive force against the biasing force of the elastic member 40. In a case where the operating part 10 receives the operating load Fb, a load (Fa−Fb) obtained by subtracting the operating load Fb from the initial load Fa is given to the pressure receiving part 21 by the operating load Fb opposite to the initial load Fa.

As illustrated in FIG. 10B, in a case where the operating load Fb received by the operating part 10 exceeds the initial load Fa, the operating load Fb surpasses the biasing force of the elastic member 40 and pushes the operating part 10 and the linking part 30 toward the rear end side. As a result, the pressure receiving part 21 moves away from the other end part 32 of the linking part 30, and no load is applied to the pressure receiving part 21.

Even in the configuration in which the operating part 10 and the load sensor 20 are arranged in the second direction D2 as in the load sensor unit 1E, a load on the operating part 10 can be accurately detected by the load sensor 20 as long as a direction of forward and backward movement of the operating part 10 and a direction of a load received by the load sensor 20 are the first direction D1. Therefore, in the load sensor unit 1E, freedom of layout of the operating part 10 and the load sensor 20 can be increased. For example, an entire length in the first direction D1 can be shortened as compared with other examples of the configuration.

Figure 11A:
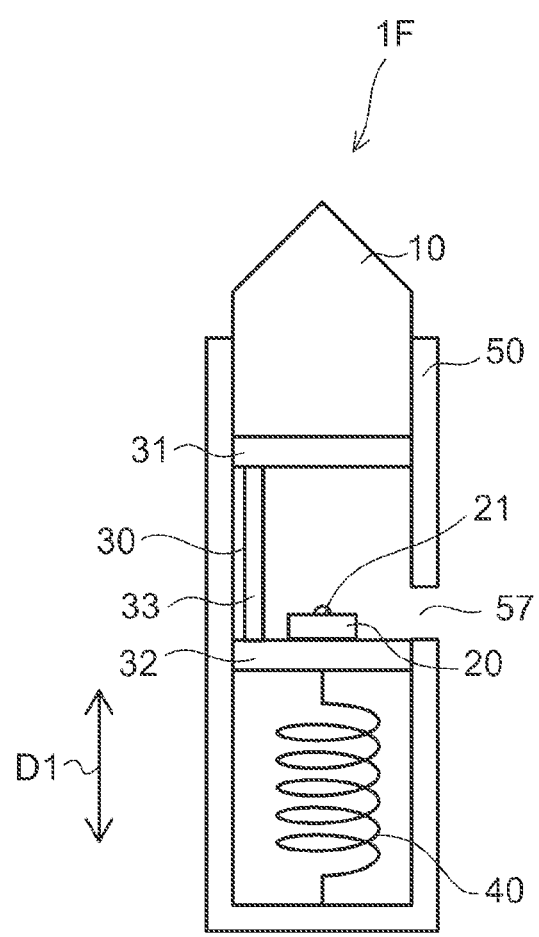
FIGS. 11A and 11B are schematic views illustrating another (fifth) example of the configuration.
Figure 11B:
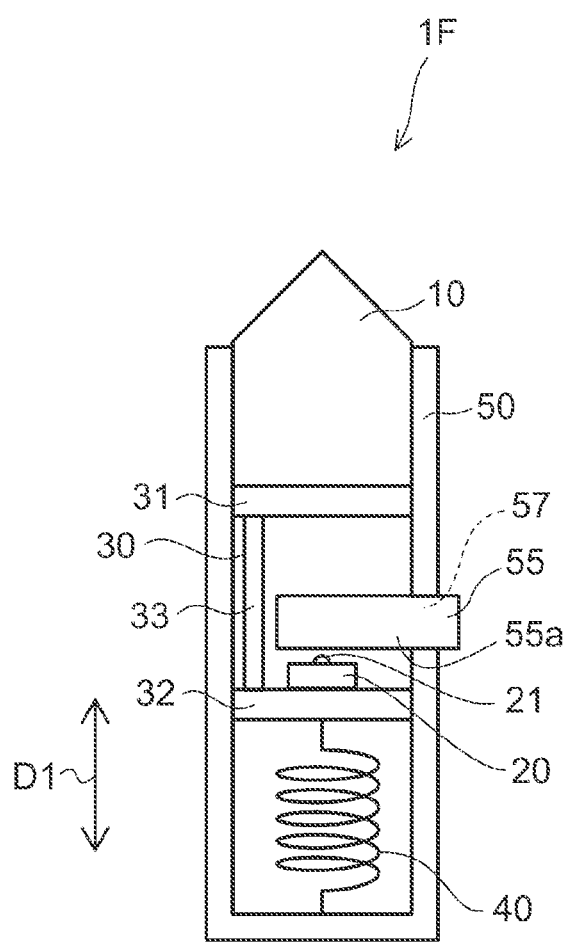

FIGS. 11A and 11B are schematic views illustrating another (fifth) example of the configuration.

In a load sensor unit 1F illustrated in FIGS. 11A and 11B, the reference member 55 is insertable into the case 50.

FIG. 11A illustrates a state where the reference member 55 has not been inserted yet. In the case 50, the operating part 10, the linking part 30, and the elastic member 40 are contained so as to be arranged in the first direction D1. The load sensor 20 is mounted on the other end part 32 of the linking part 30.

FIG. 11B illustrates a state where the reference member 55 has been inserted. To insert the reference member 55, the reference member 55 is inserted from an insertion hole 57 of the case 50 in a state where the operating part 10 is pushed toward the rear end side and the elastic member 40 is contracted. After the insertion, the pushed state of the operating part 10 is cancelled. This causes the operating part 10 and the linking part 30 to be pushed up toward the front end side due to biasing force of the elastic member 40, but the operating part 10 and the linking part 30 stop at a position where the pressure receiving part 21 of the load sensor 20 makes contact with the one surface 55a of the inserted reference member 55. This state is an initial state, and the biasing force of the elastic member 40 is given to the load sensor 20 as the initial load Fa.

Figure 12A:
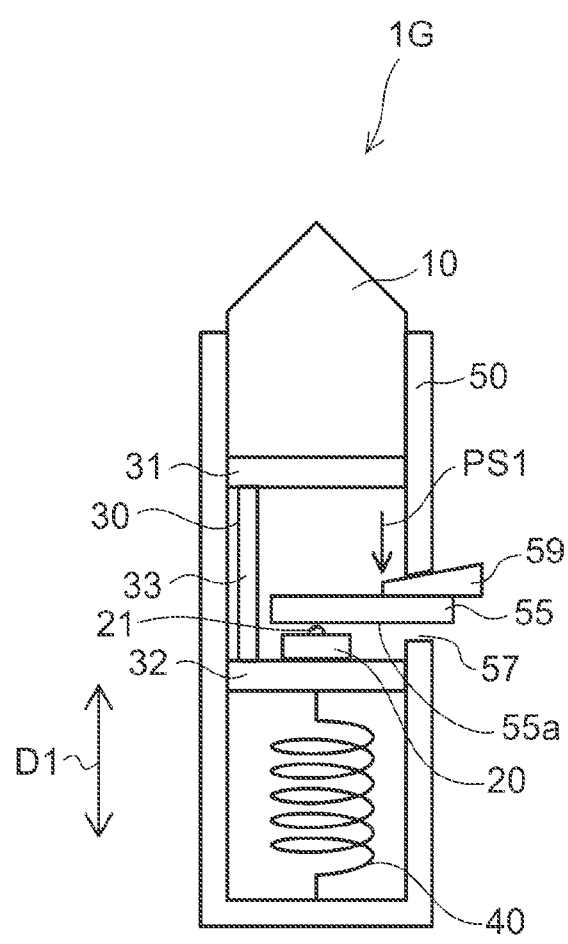
FIGS. 12A and 12B are schematic views illustrating another (sixth) example of the configuration.
Figure 12B:
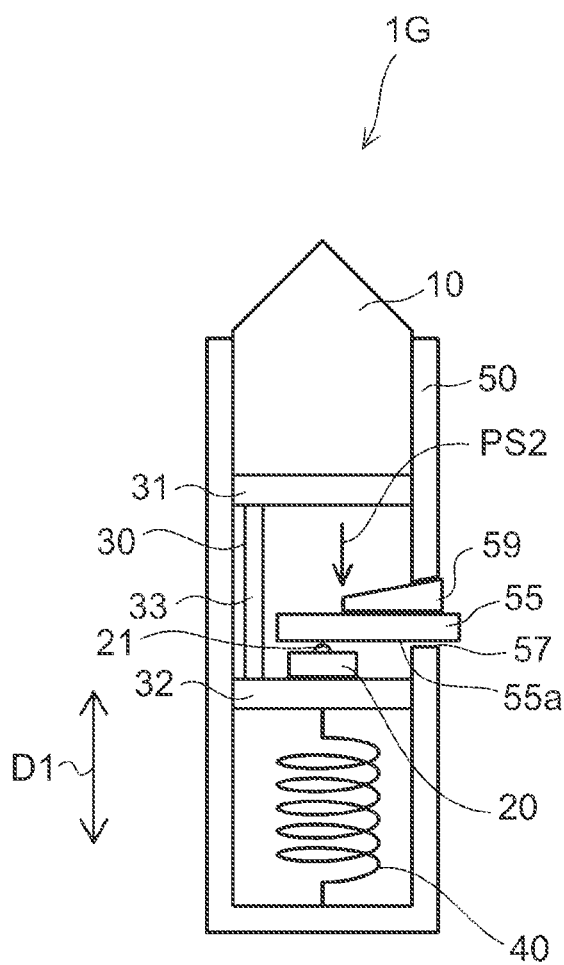

FIGS. 12A and 12B are schematic views illustrating another (sixth) example of the configuration.

In a load sensor unit 1G illustrated in FIGS. 12A and 12B, the reference member 55 is insertable into the case 50 as in the load sensor unit 1F. In the load sensor unit 1G, a position of the reference member 55 in the first direction D1 is adjustable by a taper member 59.

FIG. 12A illustrates a state where the taper member 59 has been inserted to a first position PS1. The taper member 59 is inserted into the insertion hole 57 so as to overlap the front end side of the reference member 55 in a state where the reference member 55 has been inserted into the insertion hole 57 of the case 50. An amount by which the operating part 10 and the linking part 30 are pushed is determined by a sum of a thickness of the reference member 55 and a thickness of a part of the taper member 59 inserted to the first position PS1 that overlaps the insertion hole 57.

FIG. 12B illustrates a state where the taper member 59 has been inserted to a second position PS2. In a case where the taper member 59 has been inserted to the second position PS2, which is deeper than the first position PS1, the operating part 10 and the linking part 30 are pushed more that the case where the taper member 59 has been inserted to the first position PS1. That is, an amount by which the operating part 10 and the linking part 30 are pushed varies depending on an amount by which the taper member 59 is inserted. Since biasing force of the elastic member 40 is determined in accordance with the amount by which the operating part 10 and the linking part 30 are pushed, the initial load Fa can be adjusted.

FIG. 13 is a schematic view illustrating another (seventh) example of the configuration.

In a load sensor unit 1H illustrated in FIG. 13, the connecting part 33 of the linking part 30 is provided with a flange part, and a front end side of the coil spring that is the elastic member 40 makes contact with the flange part 335.

In the load sensor unit 1H, the initial load Fa is given to the linking part 30 through the flange part 335 by the elastic member 40. The flange part 335 is provided at a middle of the connecting part 33 of the linking part 30, and therefore the linking part 30 and the elastic member 40 partially overlap each other in the first direction D1. This can make a total length of the linking part 30 and the elastic member 40 shorter than a sum of a length of the linking part 30 (a length in the first direction D1) and a length of the elastic member 40 (a length in the first direction D1), thereby allowing a reduction in size of the load sensor unit 1H in the first direction D1.

The load sensor units 1 and 1B through 1H according to the present embodiment are applicable to various kinds of input devices that detect a load caused by a user. Examples of such an input device include a pen-type input device (a stylus pen), a touch panel (one having a function of detecting a load applied to a panel), a robot arm, a game controller, a mouse, and a mobile terminal.

As described above, according to the present embodiment, it is possible to provide the load sensor units 1 and 1B through 1H and an input device that can prevent the load sensor 20 from being broken by an overload with a simple configuration and can fully demonstrate detection accuracy of the load sensor 20.

Although the present embodiment has been described above, the present invention is not limited to these examples. For example, although an example in which a coil spring is used as the elastic member 40 has been described above, the elastic member 40 may be, for example, a spring having a shape other than a coil spring or an elastic body using a resin, liquid, gas, or the like. Furthermore, a person skilled in the art can appropriately make addition, deletion, and design change of a constituent element in each embodiment and can appropriately combine features in embodiments, and such modifications are also encompassed within the scope of the present invention without departing from the spirit of the present invention.

What is claimed is:

1. A load sensor unit comprising:
an operating part that is movable forward and backward in a first direction;
a load sensor that has a pressure receiving part and outputs a signal according to a load received in the first direction by the pressure receiving part;
a linking part that has one end part linked to the operating part and another end part that causes the pressure receiving part to operate and is movable forward and backward in the first direction in synchronization with the operating part; and
an elastic member that gives biasing force to the other end part of the linking part and gives an initial load to the pressure receiving part through the other end part, wherein the elastic member is provided on a side of the other end part opposite to the one end part.

2. The load sensor unit according to claim 1, further comprising a case,
wherein the operating part, the load sensor, the linking part, and the elastic member are arranged in the first direction in the case.

3. The load sensor unit according to claim 1, wherein the elastic member is provided between the one end part and the other end part.

4. The load sensor unit according to claim 2, wherein the case has a cylindrical shape.

5. The load sensor unit according to claim 1, wherein the elastic member is a coil spring; and
the load sensor unit further comprises an adjustment mechanism that adjusts the initial load caused by the coil spring.

6. The load sensor unit according to claim 1, wherein the linking part has a connecting part provided between the one end part and the other end part; and
the one end part, the other end part, and the connecting part are provided so as to be integral with one another.

7. The load sensor unit according to claim 1, further comprising a reference member that has one surface on which the load sensor is mounted and an other surface that serves as a stopper surface in movement of the operating part.

8. The load sensor unit according to claim 1, wherein the operating part and the load sensor are arranged in a second direction orthogonal to the first direction.

9. An input device comprising:
a load sensor unit wherein the load sensor unit comprises:
an operating part that is movable forward and backward in a first direction;
a load sensor that has a pressure receiving part and outputs a signal according to a load received in the first direction by the pressure receiving part;
a linking part that has one end part linked to the operating part and another end part that causes the pressure receiving part to operate and is movable forward and backward in the first direction in synchronization with the operating part; and
an elastic member that gives biasing force to the other end part of the linking part and gives an initial load to the pressure receiving part through the other end part, wherein the elastic member is provided on a side of the other end part opposite to the one end part.

10. The input device according to claim 9, further comprising a pen-type housing,
wherein the load sensor unit is contained in the housing.

11. A load sensor unit comprising:
an operating part that is movable forward and backward in a first direction;
a load sensor that has a pressure receiving part and outputs a signal according to a load received in the first direction by the pressure receiving part, wherein the operating part and the load sensor are arranged in a second direction orthogonal to the first direction;
a linking part that has one end part linked to the operating part and another end part that causes the pressure receiving part to operate and is movable forward and backward in the first direction in synchronization with the operating part; and
an elastic member that gives biasing force to the other end part of the linking part and gives an initial load to the pressure receiving part through the other end part.

* * * * *